US006625807B1

(12) United States Patent
Chen (10) Patent No.: US 6,625,807 B1
(45) Date of Patent: Sep. 23, 2003

(54) APPARATUS AND METHOD FOR EFFICIENTLY OBTAINING AND UTILIZING REGISTER USAGE INFORMATION DURING SOFTWARE BINARY TRANSLATION

(75) Inventor: Ding-Kai Chen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/371,466

(22) Filed: Aug. 10, 1999

(51) Int. Cl.[7] .............................. G06F 9/45; G06F 9/44; G06F 15/00; G06F 9/455
(52) U.S. Cl. ....................... 717/154; 717/128; 717/136; 712/227; 703/23
(58) Field of Search ................................. 717/151, 100, 717/152, 153–161, 136–150; 711/100; 708/212; 345/440; 712/2, 7, 227, 300; 703/23, 28

(56) References Cited

U.S. PATENT DOCUMENTS

| 4,571,678 | A | * | 2/1986 | Chaitin ....................... 717/156 |
| 5,586,323 | A | * | 12/1996 | Koizumi et al. ............ 717/174 |
| 5,761,514 | A | * | 6/1998 | Aizikowitz et al. ......... 717/158 |
| 5,784,066 | A | * | 7/1998 | Aizikowitz et al. ......... 345/440 |
| 5,828,886 | A | * | 10/1998 | Hayashi ....................... 717/159 |
| 6,226,789 | B1 | * | 5/2001 | Tye et al. .................... 717/138 |

* cited by examiner

Primary Examiner—Hoang-Vu Antony Nguyen-Ba (57) ABSTRACT

Apparatus and method are described for register optimization during code translation and utilizes a technique that removes the time overhead for analyzing register usage, and eliminates fixed restraints on the compiler register usage. The present invention for register optimization utilizes a compiler to produce a bit vector for each program unit (i.e., subroutine, function, and/or procedure). Each bit in the bit vector represents a particular caller-saved register. A bit is set if the compiler uses the corresponding register within that program unit. During the translation, the translator examines the bit vector to very quickly determine which registers are free, and therefore can be used during register optimization without having to save and restore the register values.

16 Claims, 10 Drawing Sheets

```
S1   R3<= R1 + R2     ;CHANGE R3 VALUE
     USE R3
     ...
     R3<=
     ...
S2   R3<= R1 + R2     ;RECOMPUTE R1+R2
     USE R3
     ...
```
— 121

⇓

```
S0   R3<= R1 + R2
     R4<=R3           ;USE R4 TO STORE R3 VALUE
S1   USE R3
     ...
     R3<=             ;CHANGE R3 VALUE
     ...
S2   R3<= R4          ;NO NEED TO RECOMPUTE R3
     USE R3
     ...
```
— 122

FIG. 10B

```
S1   R3<= R1 + R2     ;CHANGE R3 VALUE
     USE R3
     ...
     R3<=
     ...
S2   R3<= R1 + R2     ;RECOMPUTE R1+R2
     USE R3
     ...
```
— 125, 126

⇓

```
S0   R3<= R1 + R2
     R4<=R3           ;USE R4 TO STORE R3 VALUE
S1   USE R3
     ...
     R3<=             ;CHANGE R3 VALUE
     ...
```
— 127

```
S2   R3<= R4          ;NO NEED TO RECOMPUTE R3
     USE R3
     ...
```
— 128

APPARATUS AND METHOD FOR EFFICIENTLY OBTAINING AND UTILIZING REGISTER USAGE INFORMATION DURING SOFTWARE BINARY TRANSLATION

BACKGROUND OF THE INVENTION

1. Field of the Invention

The present invention is generally related to register usage optimization, and more particularly related to an apparatus and method for efficiently obtaining and utilizing register usage information for register optimization during software binary translation.

2. Description of Related Art

As is known in the computer and software arts, when a software program is developed it will be optimized to run on a particular computer architecture. While it is possible that the software program developed for an original computer architecture will run on a computer system with a new architecture, the execution of the software program optimized for an old computer architecture will not generally run as quickly on a computer system with a new architecture, if at all.

Therefore, devising a way to run an existing (i.e. old) architecture binary version of a computer program on a new architecture, or improve the performance of the computer program on the existing architecture, is an important procedure. Several techniques are used in the industry to run the binary code of an old architecture on a new architecture. Four common techniques, from slowest to fastest will now be discussed: software interpreter; microcoded emulator; binary translator; and a native compiler.

A software interpreter is a program that reads instructions of the old architecture, one at a time, performing each operation in turn on a software-maintained version of the old architecture's state. Interpreters are not very fast, but they run on a wide variety of machines and can faithfully reproduce the behavior of self-modifying programs, programs that branch to data, programs that branch to a checksum of themselves, etc. Caching interpreters gain speed by retaining predecoded forms of previously interpreted instructions.

A microcoded emulator operates similar to that of a software interpreter, but usually with a number of key hardware assists to decode the old instructions quickly, and to hold hardware state information in registers of the micromachine. An emulator is typically faster than an interpreter, but can run only on a specific microcoded new machine. This technique cannot be used to run existing code on a reduced instruction set computer (RISC) machine, since RISC architectures do not have a microcoded hardware layer underlying the visible machine architecture.

A translated binary program is a sequence of new-architecture instructions that reproduce the behavior of an old-architecture program. Typically, much of the state information of the old machine is kept in registers in the new machine. Translated code faithfully reproduces the calling standard, implicit state, instruction side effects, branching flow, and other artifacts of the old machine. Translated programs can be much faster than ones operated upon by interpreters or emulators, but slower than native-compiled programs.

Translators can be classified as either (1) bounded translation systems, or (2) open-ended translation systems. In bounded systems, all the instructions of the old program must exist at translation time and must be translated to new instructions. This usually requires manual intervention to find 100 percent of the code. In open-ended systems, program code may be discovered, created, or modified at execution time, and can generally be fully automatic.

A native-compiled program is a sequence of new-architecture instructions produced by recompiling the program. Native-compiled programs usually use newer, faster calling conventions than old programs. With a well-tuned optimizing compiler, native-compiled programs can be substantially faster than any of the other choices. However, the problem is that this process requires source code to be implemented, and source code is not always available.

Most large programs are not self-contained; they call library routines, windowing services, databases, and toolkits, for example. These programs also directly, or indirectly, invoke operating system services. In simple environments with a single dominant library, it can be sufficient to rewrite that library in native code and to interpret user programs, particularly user programs that actually spend most of their time in the library. This strategy is commonly used to run Windows and Macintosh programs under the UNIX or LINUX operating system.

One requirement for binary translation is that the behavior of the binary code cannot be changed. This is because the state of the binary execution is stored in hardware registers and in memory locations. This means that no useful register values can be destroyed because it would cause execution errors.

On the other hand, to optimize the performance, and to instrument a procedure for profiling, usually requires additional registers. One approach is to always save and restore register values before and after the part of the code that uses the additional registers by the translator.

A better solution is to analyze the binary code to discover which registers do not contain useful or live information. This approach incurs severe time overhead and sometimes a code cannot be completely analyzed. In other cases, free registers cannot be discovered, even though a large amount of time is spent on analyzing.

A third approach involves an agreement between the compiler, which is responsible for generating the original binary, and the translator. The compiler is limited to use certain registers, while other registers are left available to be used by the translator, regardless of whether the translator needs that many registers.

There are numerous things that are important to consider during a software binary translation, such as register allocation and assignment. Register allocation and assignment, for almost all computer architectures, is among one of the most important of all optimization techniques. One goal of optimization is to minimize the traffic between CPU registers, which are usually few and fast to access in whatever lies within memory. This memory includes one or more levels of cache, and main memory which is generally much slower to access, but also larger in size. The main memory and cache memory generally increase in size and decrease in speed the further removed they are from the registers.

Register allocation determines which of the values (variables, temporaries, and large constants) might be better utilized if retained within the machine registers. Register allocation is important because the registers are almost always a scarce resource. There are rarely enough of them to hold all the objects that the programmer would like them to hold, and because of RISC systems, almost all operations other than data movement operate entirely on register contents and not storage. In modern complex instruction set computing (CISC) implementations, register to register operations are significantly faster than those that take one or two memory operands.

Heretofore, software developers have lacked an efficient apparatus and method for accomplishing notification of register usage and register optimization during code translation.

SUMMARY OF THE INVENTION

To achieve the advantages and novel features, the present invention is generally directed to an apparatus and method for efficiently accomplishing register optimization during code translation. The present invention for register optimization during code translation utilizes a technique that removes the time overhead for analyzing register usage, and removes fixed restraints on the compiler register usage. This is accomplished by making the task of finding free registers more efficient by communicating between compiler and the translator.

In the present invention, the compiler produces a bit vector for each program unit, (i.e., subroutine, function, and/or procedure). A bit in the vector represents a particular caller-saved register. A bit is set if the compiler uses the corresponding register within that program unit. During the translation, the translator examines the bit vector to very quickly determine which registers are free, and therefore can be used during the register optimization, without having to save and restore the register values.

In another embodiment, the software program can be further optimized by taking a logical "OR" of the bit vectors between different program units, (i.e., subroutines, functions, and/or procedures), where the resulting bit vector from the logical "OR" indicates which registers are free to be used for translation when the translator provides code for more than one program unit.

An advantage of this is that the bit vector technique is particularly useful for performance improving translations performed at runtime. Translation performance is improved because the analysis overhead that would directly reduce performance is not performed. In the preferred method of the present invention, because the translator may inspect the bit vector very quickly, the overhead is dramatically reduced, which results in improved runtime performance. The preferred method of the present invention utilizes a data structure (a register usage bit vector) that is a vehicle (or communication channel) between a static compiler and a binary translator. The register usage bit vector is used to simplify the identification of free registers in the main transformation phase of the translator.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

Figure 1:
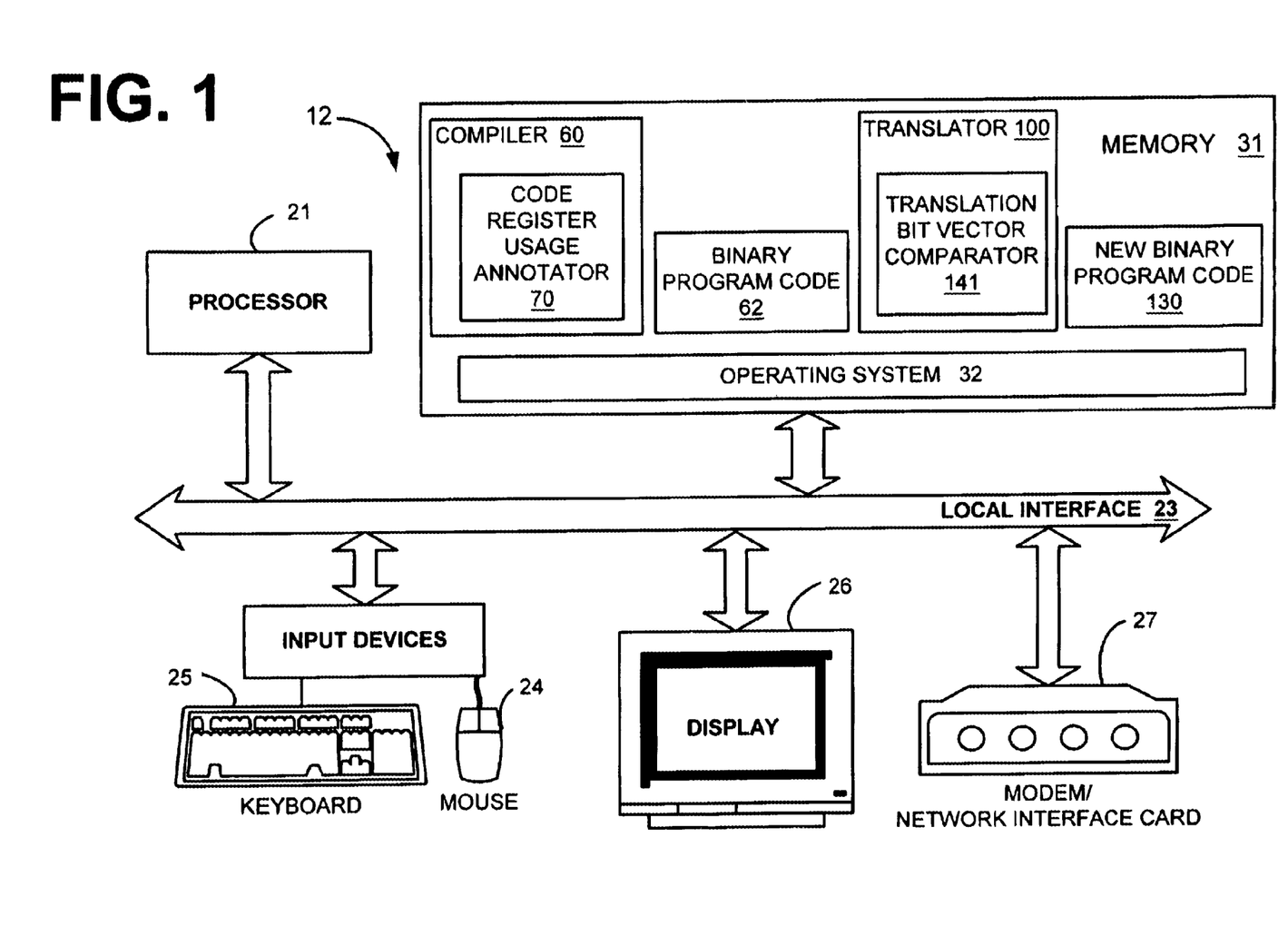
FIG. 1 is a block diagram of a user system showing the compiler and translator of the present invention within the memory area.

As illustrated in FIG. 1, computer system 12 generally comprises a processor 21 and memory 31 (e.g., RAM, ROM, hard disk, CD-ROM, etc.) with an operating system 32. The processor 21 accepts code and data from the memory 31 over the local interface 23, for example, a bus(es). Direction from the user can be signaled by using input devices, for example but not limited to, a mouse 24 and a keyboard 25. The actions input and resulting output are displayed on the display terminal 26.

Also shown in FIG. 1, is the compiler 60, original binary program code 62 and translated new binary program code 130, and translator 100 in memory area 31. These components are herein described in further detail with regard to FIGS. 4–9.

Figure 2:
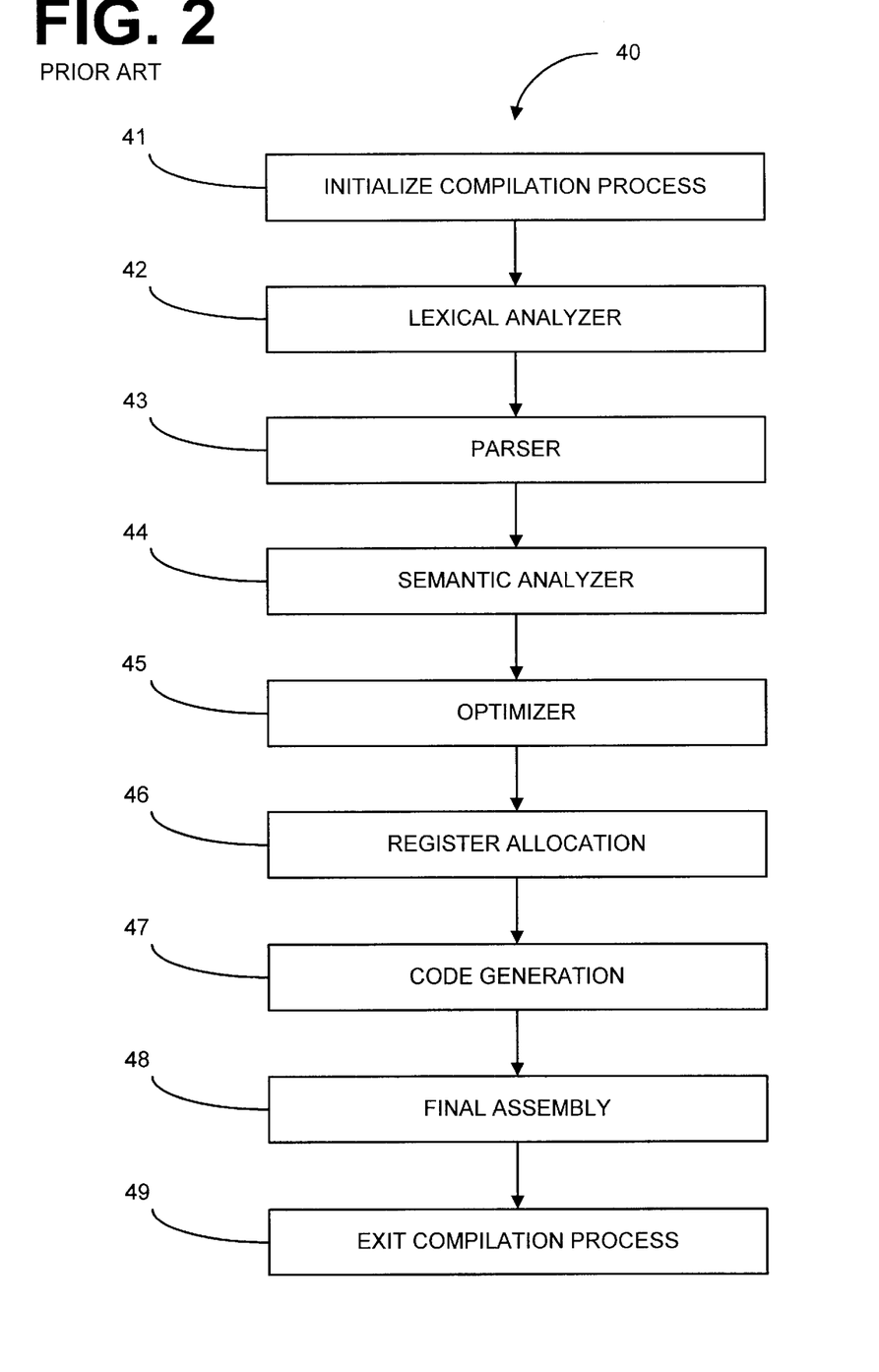
FIG. 2 is a flow chart of a well-known prior art method to perform a compilation process.

Illustrated in FIG. 2 is the prior art methodology of performing a compilation process 40. A compiler consists of a series of phases that sequentially analyze given forms of a program and synthesize new program forms. The compiler 40 begins with a sequence of characters constituting a source program that is compiled and produces a relocatable object module that can be linked with others and loaded in a computer machine memory to be executed.

There are at least four phases in a compilation process. First, the compilation process is initialized at step 41. The compilation process 40 performs the lexical analyzer at step 42. The lexical analyzer performs analysis on the character string presented to it and is divided into tokens that are legal members of the vocabulary of the computer language in which the computer program is written.

A parser is executed at step 43. A parser processes the sequence of tokens and produces an intermediate level representation, such as a parse tree or sequential intermediate code, and simple table that records the identifiers used in the program and/or attributes. The parser may produce error messages of the token strings containing syntax errors.

The semantic analyzer operation is next performed at step 44. The analyzer is for checking a program for validity. This process takes the input of the intermediate code generated in the parsing step 43 and a symbol table, and determines whether or not the program satisfies the properties required by the source language, i.e., where the identifiers are consistently declared and used. The analyzer step 44 may produce an error message if the program is inconsistent or fails in some other way to satisfy the requirements of the programming language definitions.

Next, an optimizer is performed at step 45. The optimizer examines the intermediate code produced by the parser to produce control-flow and data-flow information. Then, based on that information, the optimizer transforms the intermediate code to produce a more efficient version of the code. Typical transformations include the elimination of dead code, copy propagation, common sub-expression elimination, strength reduction, loop-invariant code motion, etc.

The register allocation is then performed at step 46. The intermediate code produced by the parser assumes that there is unlimited number of virtual registers available to hold program-data. Before code generation, these virtual registers are assigned to physical registers. Since there will be more virtual registers used than the physical registers available in the hardware, a portion of the program data needs to be spilled (i.e. loaded) to memory. A load instruction into scratch register is inserted for spilled data before computation involving the spilled data and a store instruction is inserted after the computation. Therefore, one goal of register allocation is to keep as much data in register as possible to minimize the load/store instructions for the spilled data.

The code generation step is then performed at step 47. Code generation utilizes the intermediate code generated in the parser step 43 and analyzer step 44, and transforms the code into equivalent machine code in a form of a relocatable object module or directly executable object code. Any detected errors may be warnings or definite errors, and in the later case, may terminate the compilation.

In addition to the four phases, a compiler includes a symbol table (not shown), its access routines (not shown), an interface to the operating system and user environment (to read and write files, read user input, output messages to the user, etc.) (not shown), that are available to all phases of the compilation process. Alternatively, the lexical and parsing processes can be combined into a single pass that produces both a symbol table and some form of intermediate code. Checking and generation of the object code from the intermediate code may be done as a separate second pass (or in two separate passes). The object code produced by the compiler is relocatable target machine code and an assembly output may be generated for a user to see the compilation result.

Next, at step 48 the compilation process performs the final assembly step. However, this step is optional since many compilers generate binary machine codes without requiring an assembly output. The compilation process 40 exits at step 49.

Once a program or its parts have been compiled, they are generally linked to interconnect the parts of the program in any needed library routines. The program and its parts and any needed library routines are read and then relocated by a loader to produce a machine-executable image in memory. The linking may be done before execution, during execution, or may be split between the two.

Figure 3:
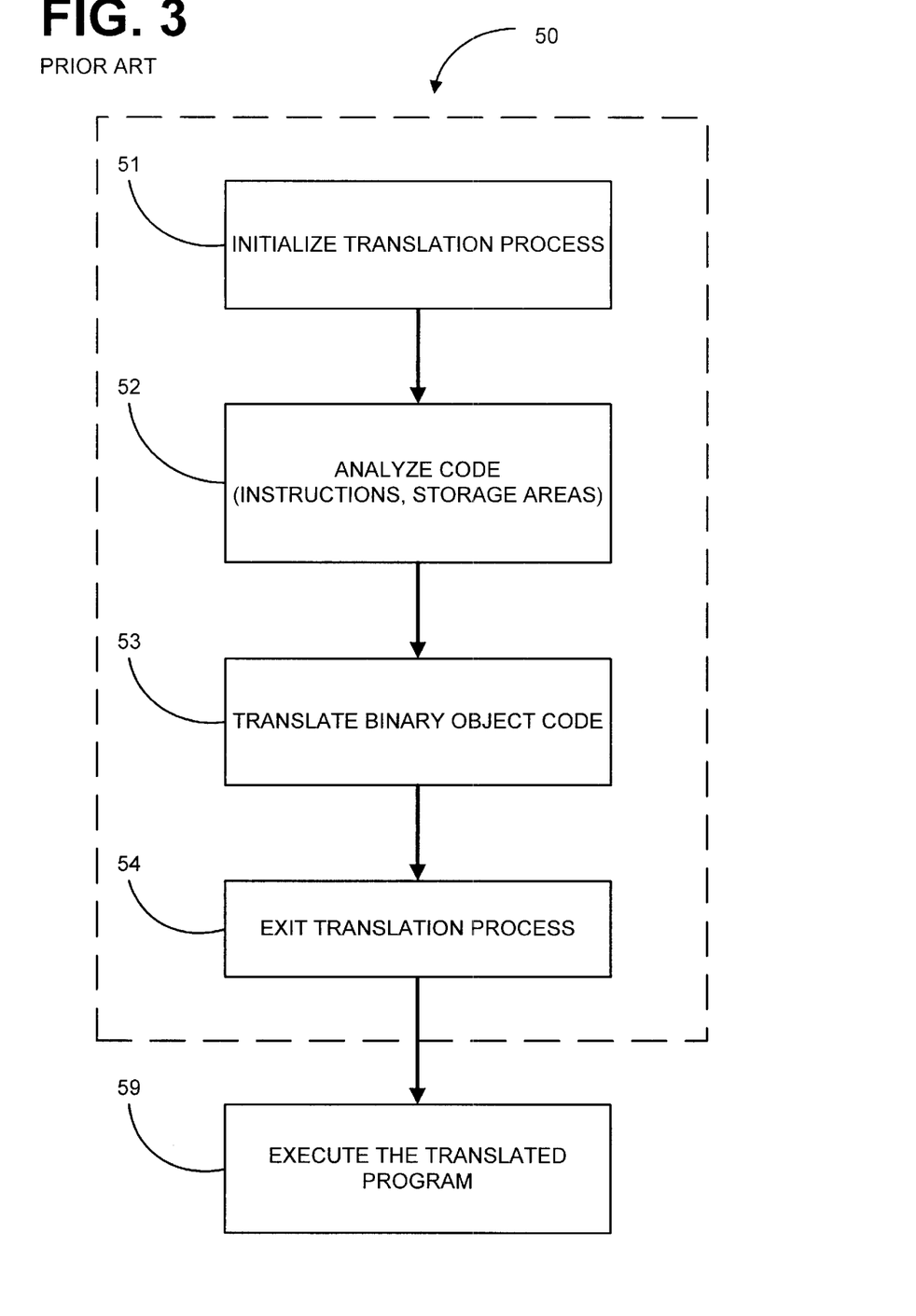
FIG. 3 is a flow chart of a well-known prior art method to perform the translation of a software program and the execution of the translated program.

Illustrated in FIG. 3 is a flow chart of a prior art methodology for performing the translation process 50. First, the translation process of the prior art is initialized at step 51. Next, the translation process 50 analyzes the executable object code at step 52. During the analysis, the translation process analyzes the instructions, registers, and storage areas utilized by the object code. The translation process 50 then translates the code into the translated binary object code at step 53. The translation process 50 exits at step 54 and allows for execution of the translated program at step 59.

Figure 4A:
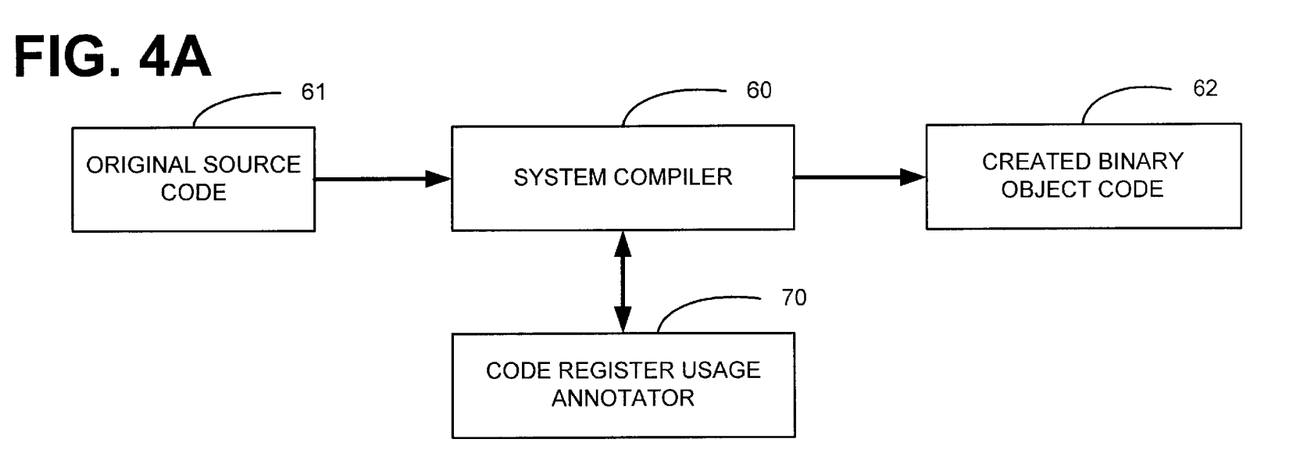
FIG. 4A is a block diagram of the system of the present invention showing the interaction between the code register usage annotator and the system compiler to create a binary object program from the original source code.

Illustrated in FIG. 4A is a block diagram of the interaction between the original source code, system compiler, register usage annotator and the created binary object code of the present invention. The original source code 61 is input into the system compiler 60 of the present invention. The system compiler of the present invention includes the improvement that allows the system compiler 60 to interact with the code register usage annotator 70, to achieve the bit vector generation of the present invention. The bit vector generation of the present invention assists the binary translation compiler 100 in the creation of the translated new binary program code 130. The compilation process 60, is herein defined in further detail with regard to FIG. 5. The register usage annotator 70 generates bit vector annotation for each procedure based on register allocation results of the system compiler 60. The register usage annotator 70, is herein defined in further detail with regard to FIG. 6.

Figure 4B:
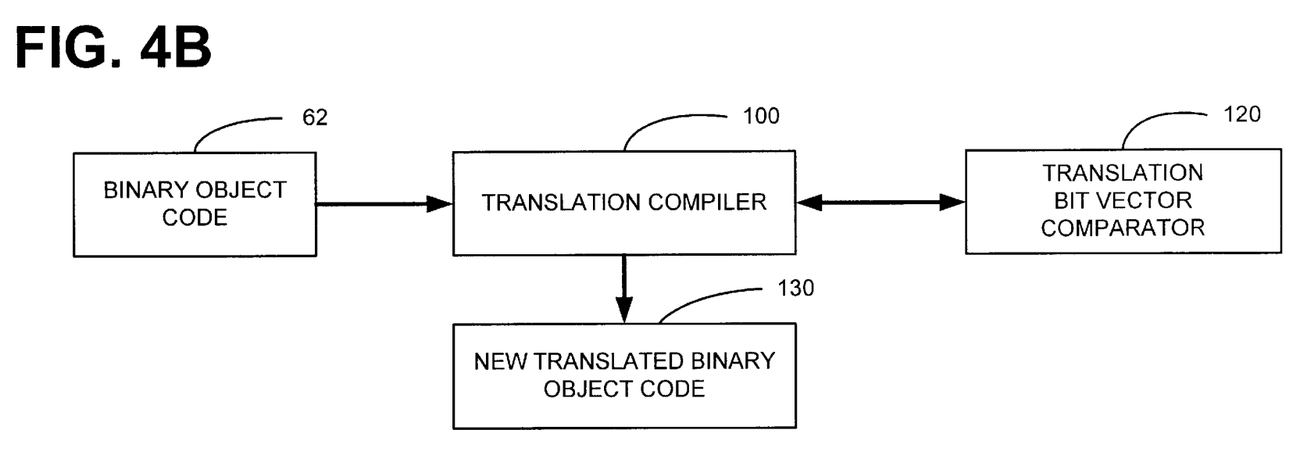
FIG. 4B is a block diagram of the system of the present invention showing the interaction between the binary object program, the translation compiler, and the translation vector comparator to create a new translated binary object program.

Illustrated in FIG. 4B is a block diagram of the translation process of the present invention. The original binary program code 62 generated by the system compiler 60 of the present invention is input into the translation compiler 100 of the present invention. The translation compiler interacts with the translation bit vector comparator 120 to generate the newly translated new binary program code 130. The translation bit vector comparator 120 utilizes the bit vector created in the code register usage annotator 70 process. The translation process illustrated in FIG. 4B, is herein defined in further detail with regard to FIGS. 8 and 9.

Figure 5:
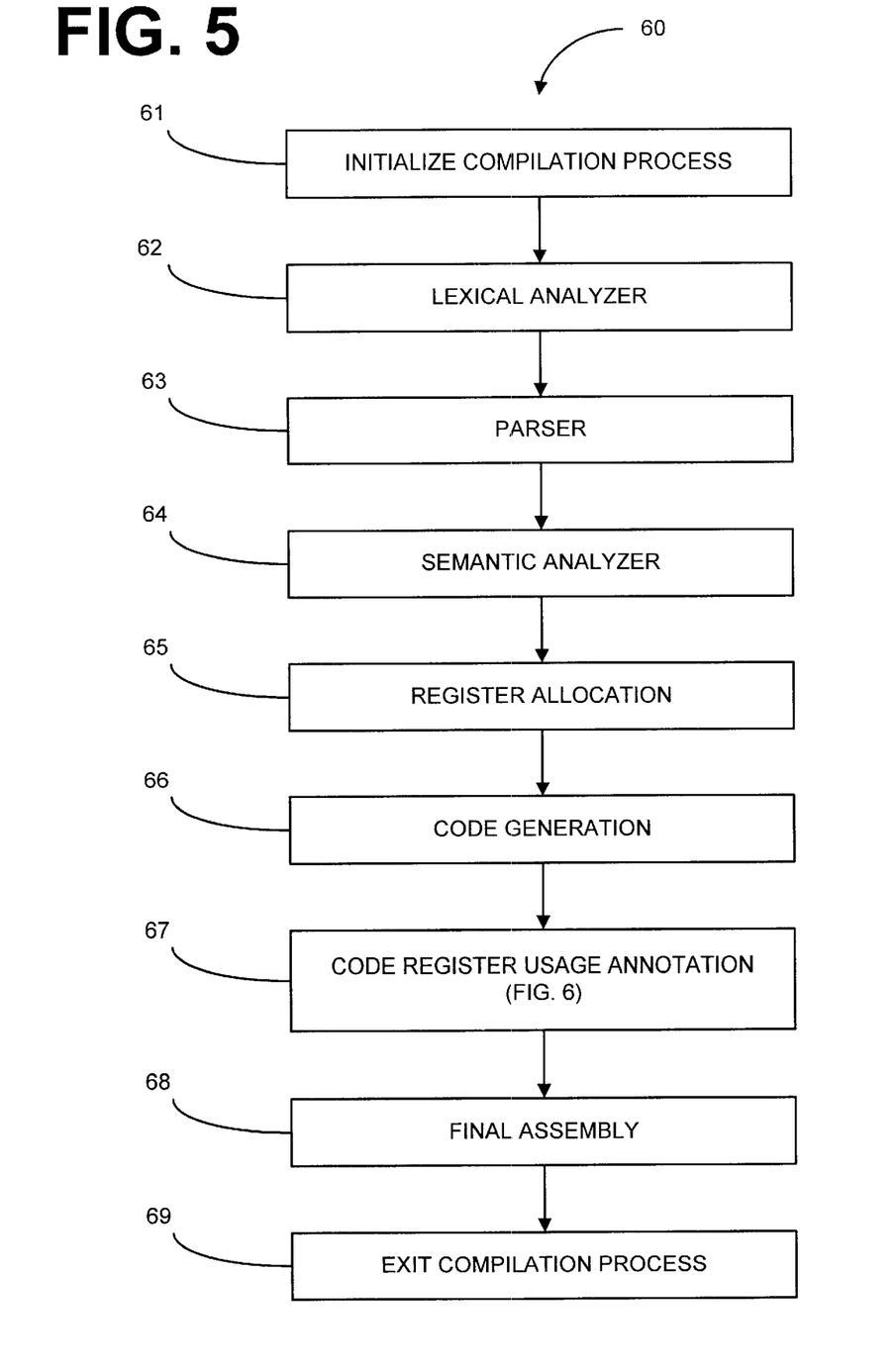
FIG. 5 is a flow chart of the preferred method to perform the compilation process, as shown in FIGS. 1 and 4A.

Illustrated in FIG. 5 is the compilation process 60 of the present invention. First, the compilation process is initialized at step 61. Next, the compilation process 60 performs the lexical analyzer at step 62. Then, a parser is executed at step 63. As noted above, the parser processes the sequence of tokens and produces an intermediate level representation, such as a parse tree or sequential intermediate code, and symbol table that records the identifiers used in the program and/or attributes. The parser may produce error messages if the token strings contain syntax errors.

The semantic analyzer is performed at step 64. As noted above, the semantic analyzer checks a program for validity. The semantic analyzer takes the input of the intermediate code generated in the parsing step 63 and a symbol table, and determines whether the program satisfies the schematic properties required by the source language, i.e., where the identifiers are consistently declared and used. The semantic analyzer step 64 may produce an error message if the program is schematically inconsistent or fails to satisfy the requirements of the programming language definitions.

The register allocation is then performed at step 65. Then, the compilation process 60 performs the code generation process at step 66. Code generation utilizes the intermediate code generated in the parser step 63 and semantic analyzer step 64, and transforms the code into equivalent machine code in a form of a relocatable object module or directly executable object code. Any detected errors may be warnings or definite errors, and in the later case may terminate the compilation.

The code register usage annotation process of the present invention is performed at step 67. The code register usage annotation process is herein defined in further detail with regard to FIG. 6.

Next, the compilation process performs the final assembly process at step 68. However, this step is optional since many compilers generate binary machine codes without requiring an assembly output. The compilation process 60 exits at step 69.

An alternative approach involves the code register usage annotation step 67. The compilation process 60 can inherit the register allocation information generated at step 65 and use this information for code generation since the register usage information is available in the compiler. In this way, the compiler process 60 need not scan the code again to find the register usage, as shown in FIG. 6.

Figure 6:
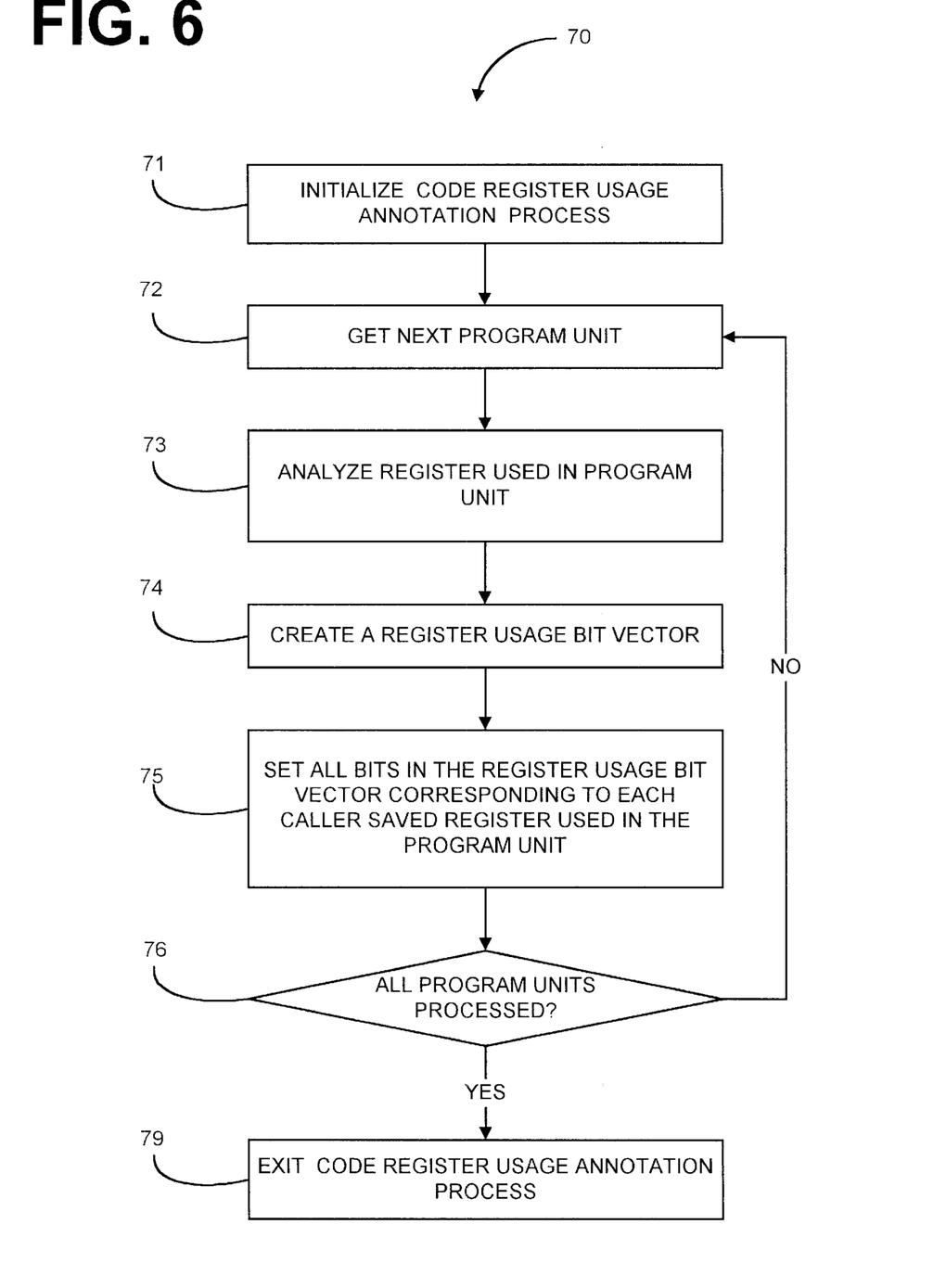
FIG. 6 is a flow chart of the preferred method to perform the code register usage annotation process, as shown in FIG. 4A.

Illustrated in FIG. 6, is a flow chart of the process for determining the code register usage annotation. The code register usage annotation process 70 is first initialized at step 71. The code register usage annotation process 70 then gets the next program unit (i.e., subroutne, function, or procedure) for analysis. The code register usage annotation process 70 determines the registers used in each program unit. The code register usage annotation process 70 creates a register usage bit vector for each program unit at step 74. The code register usage annotation process 70 sets all the bits in the register usage bit vector corresponding to each caller saved register used in the program unit at step 75. At step 76, the code register usage annotation process 70 then checks to determine whether all the program units have been processed. If all of the program units have not been processed at step 76, the code register usage annotation process 70 then repeats steps 72 through 76. If the code register usage annotation process 70 has processed all the program units in the original source program, the code register usage annotation process exits at step 79.

Figure 7:
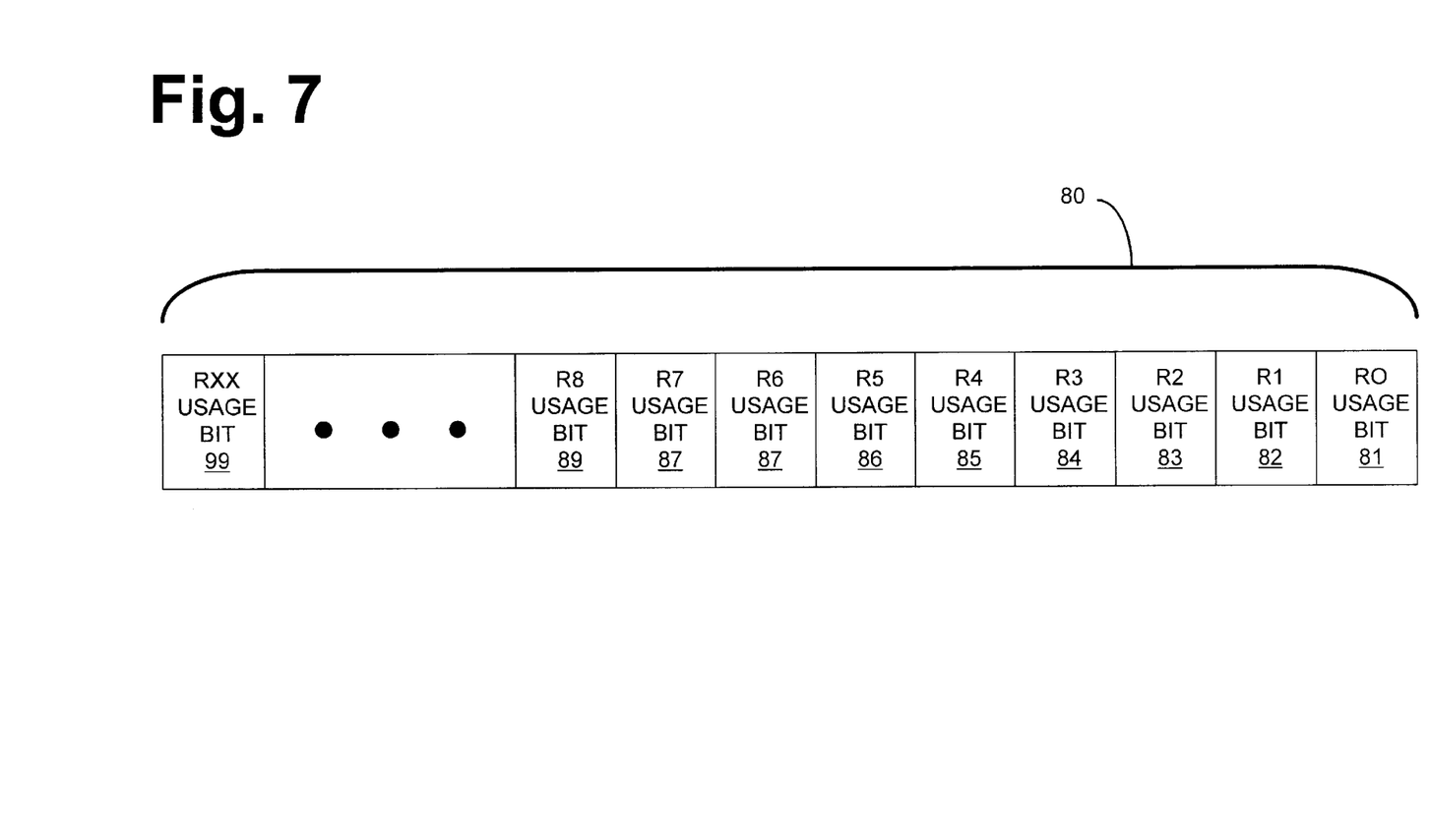
FIG. 7 is a block diagram showing the bit vector generated for each program unit of the present invention, as utilized in FIG. 4B.

Illustrated in FIG. 7 is a block diagram representing the structure of the register usage bit vector 80. The register usage bit vector 80 comprises a plurality of register usage bits 81 through 99. Each caller saved register has a corresponding usage bit within the register usage bit vector 80.

Figure 8:
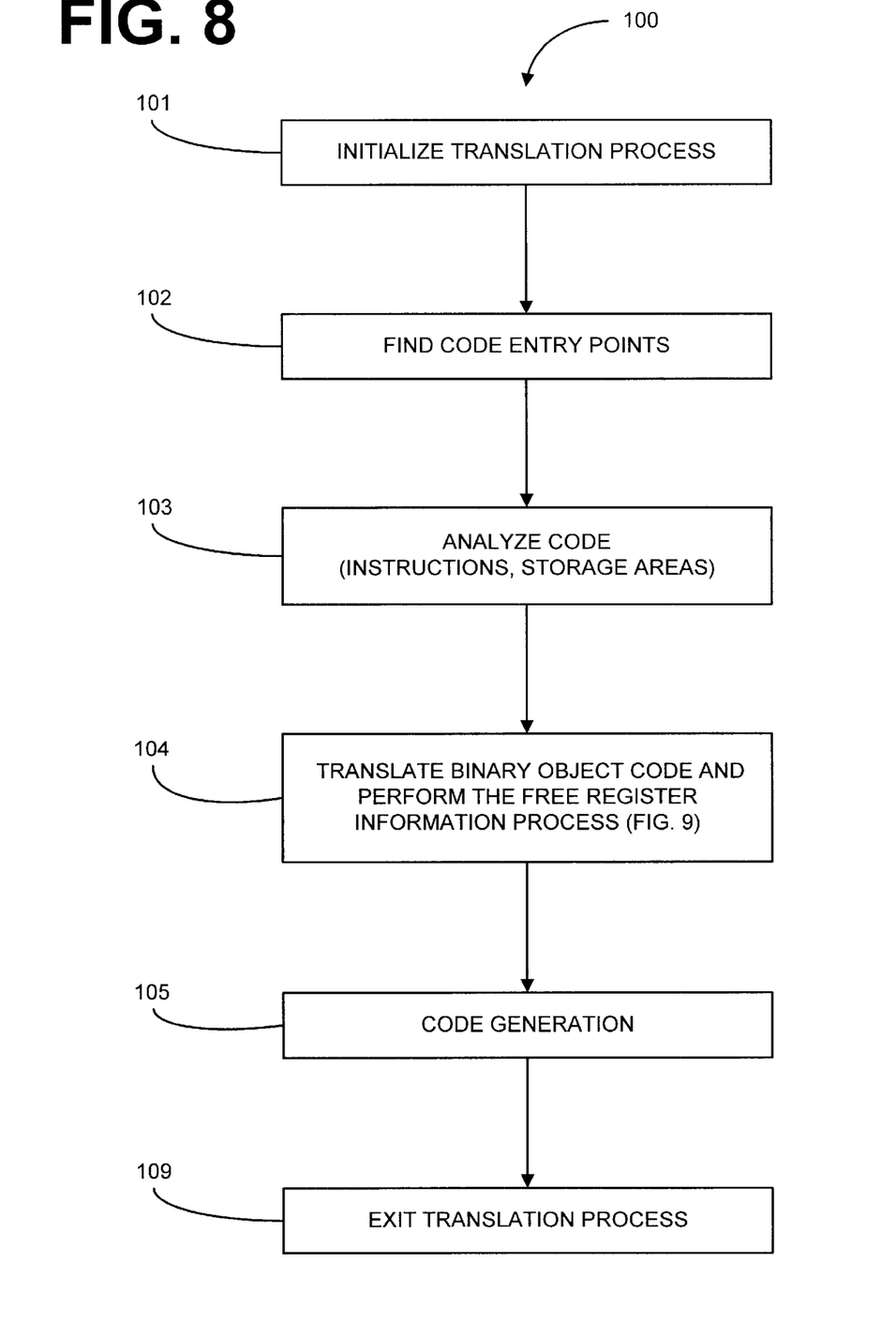
FIG. 8 is a flow chart of the preferred method to perform the translation process of the present invention that utilizes the bit vector to indicate register usage, as shown in FIGS. 4B and 7.

Illustrated in FIG. 8 is a flow chart of the translation process 100 of the present invention. First, the translation process 100 is initialized at step 101. The initialization process 101 determines or finds all the source code entry points at step 102. The translation process 100 determines all the source code entry points by analyzing the original binary program code 62 from each entry point to ascertain all the instructions and storage areas, including registers and memory locations, utilized by the original binary program code 62.

At step 104, the translation process 100 performs the translation register analysis process 110. The translation of the object code and free register information process 110, is herein defined in further detail with regard to FIG. 9. After the translation of the object code and free register information process 110 step has been performed, the translation process 100 translates the original binary program code 62 into the translated new binary program code 130 at step 105. The translation process then exits at step 109.

Figure 9:
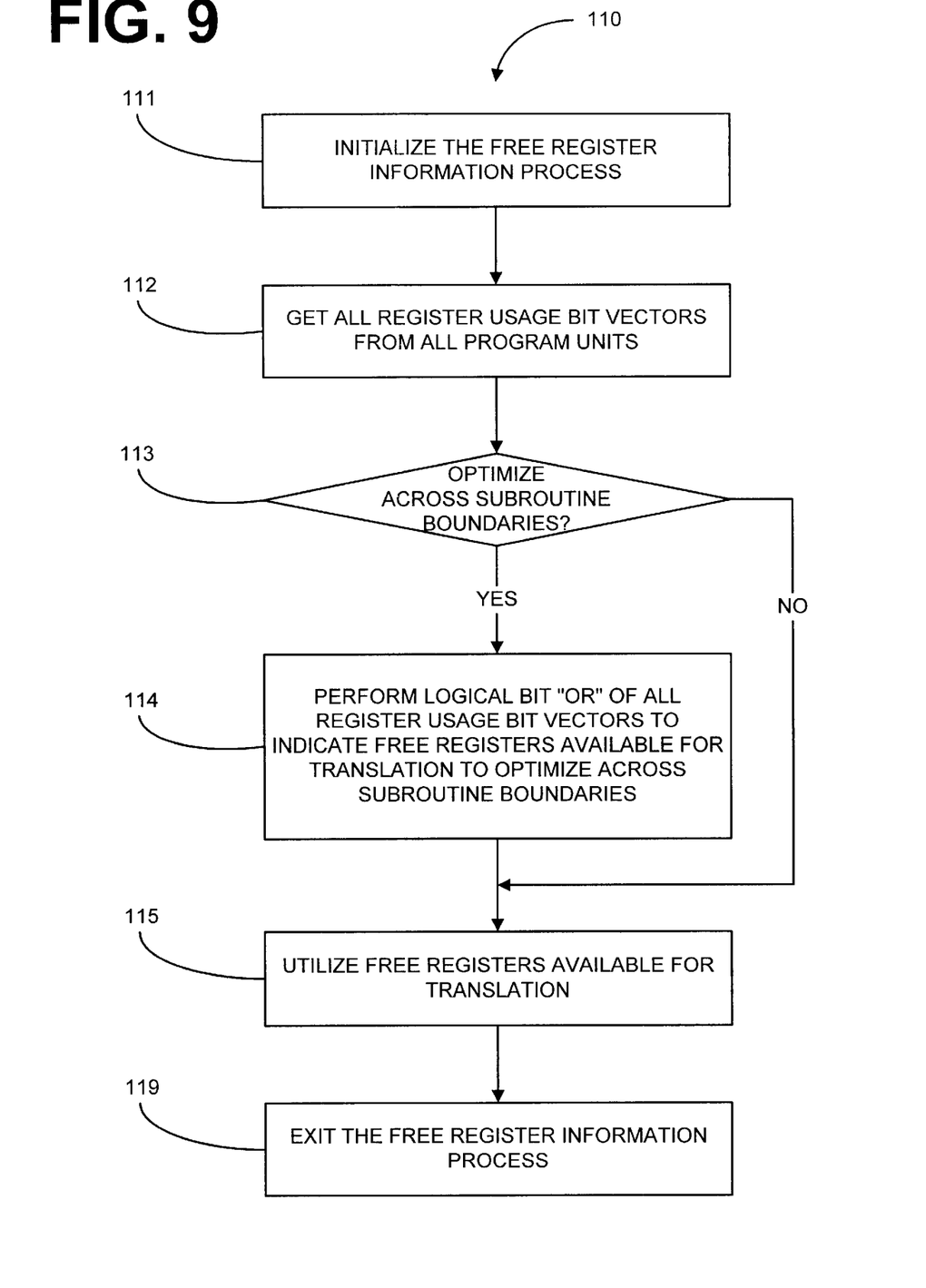
FIG. 9 is a flow chart of the preferred method to perform the free register information process performed by the translation process, as shown in FIGS. 1, 4B and 8.

Illustrated in FIG. 9 is the flow chart for the free register information process 110. The free register information process 110 is first initialized at step 111. The free register information process 110 retrieves all registered usage bit vectors from all program units within the original binary program code 62 at step 112.

Figure 10A:
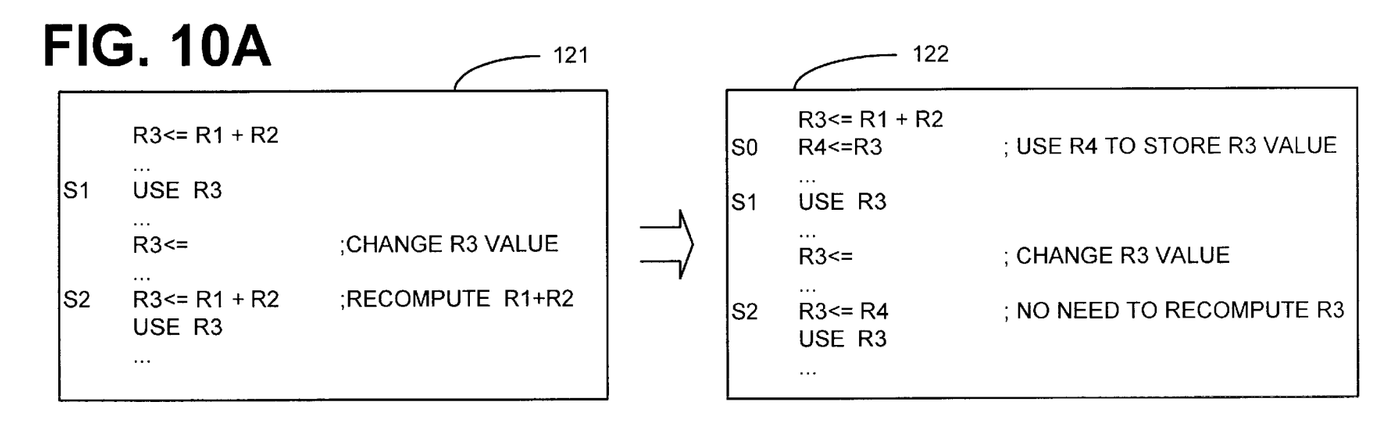
FIG. 10A is a block diagram illustrating the original source code within a program unit as it is translated to the new optimized code of the present invention.
Figure 10B:
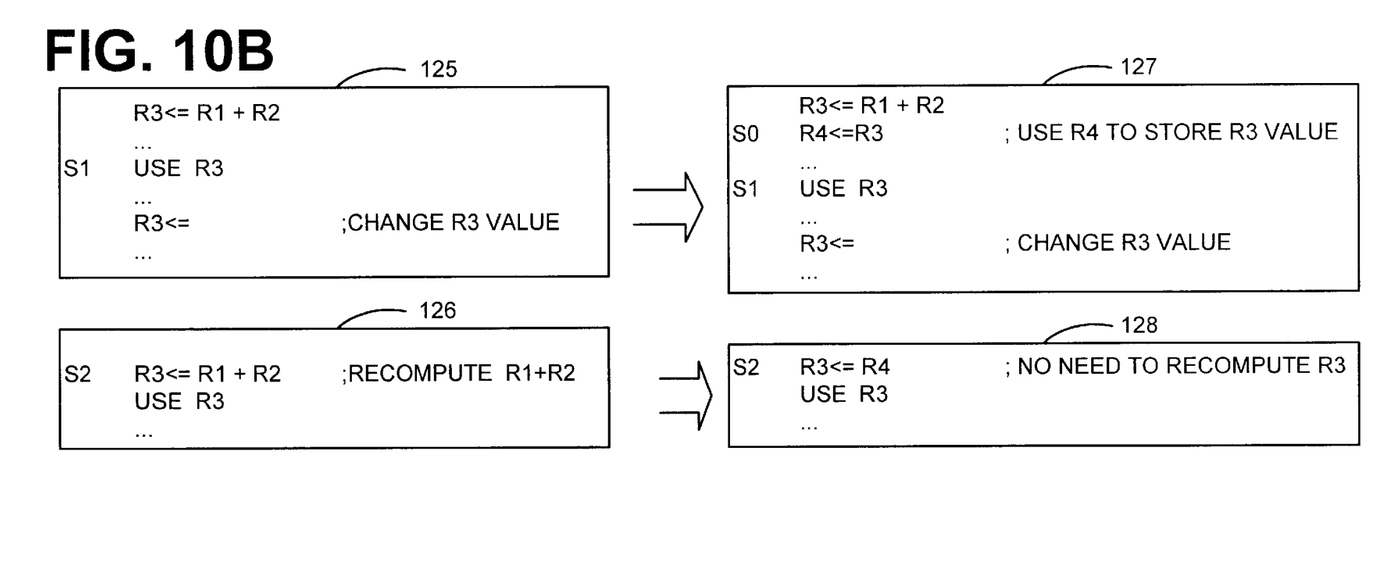
FIG. 10B is a block diagram showing an example of original source code within two different program units that are optimized across the boundary of the program units to the new translated code of the present invention.

If the free register information process 110 is to be performed across subroutine boundaries, the bit "OR" operation is performed on the register usage bit vectors of the caller and called subroutine to determine which registers are not in used in either the caller and called subroutines, such as R4 in FIG. 10B. The free register information process 110 utilizes the register usage bit vectors in the translation to optimize the original binary program code 62 across subroutine boundaries on-demand at step 114. Step 114 is not performed unless an optimization involves all procedures, and then only needs to "OR" the vectors of the procedures involved in one transformation, normally just a caller and a called subroutines.

If the free register information process 110 is not configured to optimize across subroutine boundaries, the free register information process 110 proceeds to step 115 to utilize the free registers available for translation. After utilizing the free registers available for translation, the free register information process 110 exits at step 119.

Illustrated in FIG. 10A is an example of portion 121 program instructions that could reside within the original binary program code 62 and the translation of those program instructions to optimized translated object binary object code in portion 122 that would reside within translated new binary program code 130. The original binary object code portion 121 indicates an example of register utilization prior to the translated optimization of the present invention.

As shown in block 121, the following code determines the sum of register 1 and register 2 and stores that sum into register 3. The binary object code then uses register 3 at procedure S1 for some operation and then indicates that the value within register 3 is updated. The step at procedure S2 shows that the binary object code must re-compute the sum of register 1 and register 2 to continue to utilize that value in register 3.

Block 122 shows the optimized code example of the present invention. The block 122 shows the summation of the values in register 1 and register 2 in placing that sum into register 3. The block 122 then uses register 4 to store the value of register 3 at procedure S0. The optimized code then uses register 3 and changes the value of register 3 in procedure S1, as shown above in block 121. The translated optimized object code 122 then illustrates that the sum of register 1 and register 2, which was placed into register 3, as shown in block 121, is now retrieved from register 4. A register to register move is then performed to move the value of register 4 into register 3 so that procedure S2 can then utilize register 3 as before. In order to perform this optimization, a free-register, i.e., register 4, is needed. The free register information is obtained from register usage bit vector 80.

Illustrated in FIG. 10B is an example program code where the original binary object code 62 includes two subroutines 125 and 126 for the example discussed above with regard to FIG. 10A. As before, the example shows that the values in register 1 and register 2 are summed and placed into register 3. The binary object code in block 125 then uses the contents of register 3 and changes the value in register 3 for this instruction at procedure S1 in subroutine 125.

The block 126 illustrates the subroutine that also determines the summation of the value within register 1 and register 2 to utilize the value at statement S2. Since the binary object code within blocks 125 and 126 are in different program units, the translator process register usage analysis technique of the present invention is able to optimize the register usage across program units as referenced in FIG. 9, step 114.

Shown in block 127 is the optimized code from block 125. The optimized code in block 127 shows the same summation of values in register 1 and register 2 where the summation is placed in register 3, as shown in block 125. The registered usage analysis of the present invention shows the utilization of the register usage bit vector 80 to indicate that register 4 is free in both subroutines. Therefore, the optimization of the present invention saves the value of register 3 into register 4 at subroutine 127.

Illustrated in block 128 is the optimized binary object code block retrieving the value of the summation of register 1 and register 2 from register 4 and placing the content within register 3 at subroutine 128. The block 128 then goes on to utilize the contents of register 3 as shown before with regard to block 126. The above examples in FIGS. 10A and 10B show the register usage analysis technique of the present invention, used during the optimization of the original binary program code 62.

The register usage bit vector and register optimization during code translation system, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The flow charts of the present invention show the architecture, functionality, and operation of a possible implementation of the register usage optimization compilation and translation system. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A register usage indicator system for efficiently signaling register usage in a computer program comprising a plurality of blocks of code, said register usage indicator system comprising:
   a code usage register comprising a plurality of storage bits;
   a code register usage annotator for determining if each one of plurality of registers is used in one of the plurality of blocks of code in the computer program; and
   a translation bit vector comparator for determining which of said registers are not used in all of the plurality of blocks of code in the computer program by performing a logical OR of all of said plurality of storage bits in the code usage register.

2. The apparatus of claim 1, wherein said code register usage annotator sets one of said plurality of storage bits in said code usage register for each one of the plurality of registers used in the computer program.

3. The apparatus of claim 1, wherein said code register usage annotator determines each register used in each one of the plurality of blocks of code in the computer program; and
   wherein said code register usage annotator sets each one of said plurality of storage bits in one of a plurality of storage code usage registers for each register used in each one of the plurality of blocks of code in the computer program.

4. The apparatus of claim 1, wherein said register usage comparator determines which of the plurality of registers are used in one of the plurality of blocks of code in the computer program by inspecting the bits set in said code usage register.

5. A method to efficiently signal register usage in a computer program comprising a plurality of blocks of code, the method comprising the steps of:
   determining which of a plurality of registers are used in one of the plurality of blocks of code in the computer program;
   setting one of a plurality of storage bits in a code usage register for each one of the plurality of registers used in one of the plurality of blocks of code in the computer program; and determining which of the plurality of registers are not used in all of the plurality of blocks of code by performing a logical OR of all of said plurality of storage bits in the code usage register.

6. The method of claim 5, further comprising the step of:

determining which of said registers are used in one of the plurality of blocks of code in the computer program by inspecting the bits set in said code usage register.

7. The method of claim 5, further comprising the step of:

determining which of the plurality of registers is used in each one of the plurality of blocks of code in the computer program.

8. The method of claim 7, further comprising the step of:

setting each one of said plurality of storage bits in one of a plurality of storage code usage registers for each register used in each one of the plurality of blocks of code in the computer program.

9. A register usage indicator system for efficiently signaling register usage in a computer program comprising a plurality of blocks of code, said register usage indicator system comprising:

means for determining which of a plurality of registers are used in one of the plurality of blocks of code in the computer program;

means for setting one of a plurality of storage bits in a code usage register for each one of the plurality of registers used in one of the plurality of blocks of code in the computer program; and means for determining which of said registers are not used in any of the plurality of blocks of code in the computer program by performing a logical OR of all of said plurality of storage bits in the code usage register.

10. The apparatus of claim 9, further comprising:

means for inspecting the bits set in said code usage register to determine which of said registers are used in one of the plurality of blocks of code in the computer program.

11. The apparatus of claim 10, further comprising:

means for setting each one of said plurality of storage bits in one of a plurality of storage code usage registers for each register used in each one of the plurality of blocks of code in the computer program.

12. The apparatus of claim 9, further comprising:

means for determining which of the plurality of registers is used in each one of the plurality of blocks of code in the computer program.

13. A computer-readable medium storing a computer program for efficiently obtaining and utilizing register usage information during software binary translation, comprising:

logic configured to determine which of a plurality of registers are used in one of a plurality of blocks of code in the computer program;

logic configured to set one of a plurality of storage bits in a code usage register for each one of the plurality of registers used in one of the plurality of blocks of code in the computer program; and logic configured to determine which of the plurality of registers are not used in all of a plurality of blocks of code by performing a logical OR of all of said plurality of storage bits in the code usage register.

14. The computer-readable medium of claim 13, further comprising:

logic configured to determine which of said registers are used in one of the plurality of blocks of code in the computer program by inspecting the bits set in said code usage register.

15. The computer-readable medium of claim 13, further comprising:

logic configured to determine which of the plurality of registers is used in each one of the plurality of blocks of code in the computer program.

16. The computer-readable medium of claim 15, further comprising:

logic configured to set each one of said plurality of storage bits in one of a plurality of storage code usage registers for each register used in each one of the plurality of blocks of code in the computer program.

* * * * *